US 8,175,172 B2

(12) United States Patent
Yamamoto

(10) Patent No.: US 8,175,172 B2
(45) Date of Patent: May 8, 2012

(54) HIGH SPEED DIGITAL GALVANIC ISOLATOR WITH INTEGRATED LOW-VOLTAGE DIFFERENTIAL SIGNAL INTERFACE

(75) Inventor: Kenji Yamamoto, Tokyo (JP)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 919 days.

(21) Appl. No.: 12/202,323

(22) Filed: Sep. 1, 2008

(65) Prior Publication Data
US 2010/0054345 A1    Mar. 4, 2010

(51) Int. Cl.
  *H04B 3/50* (2006.01)
(52) U.S. Cl. ...................................................... 375/257
(58) Field of Classification Search ................... 375/257
  See application file for complete search history.

(56) References Cited

U.S. PATENT DOCUMENTS

| | | | |
|---|---|---|---|
| 5,065,133 A * | 11/1991 | Howard | 375/258 |
| 6,304,106 B1 | 10/2001 | Cecchi et al. | |
| 6,448,815 B1 | 9/2002 | Talbot et al. | |
| 6,737,887 B2 * | 5/2004 | Forbes et al. | 326/86 |
| 6,927,608 B1 | 8/2005 | Chen et al. | |
| 6,944,239 B2 | 9/2005 | Cecchi et al. | |
| 7,348,805 B2 | 3/2008 | Cannon et al. | |
| 2002/0073243 A1 * | 6/2002 | Staiger | 709/313 |
| 2003/0012259 A1 | 1/2003 | Callaway, Jr. et al. | |
| 2006/0132179 A1 | 6/2006 | Kim | |
| 2007/0118334 A1 * | 5/2007 | Guenter et al. | 702/187 |

FOREIGN PATENT DOCUMENTS

WO    WO 96/26590    8/1996

OTHER PUBLICATIONS

STLVDS31, High Speed Differential Line Drivers. Mar. 2006.
STLVDS32B, High Speed Differential Line Receivers, Aug. 2007.

* cited by examiner

Primary Examiner — Shuwang Liu
Assistant Examiner — Michael Neff

(57) ABSTRACT

Various types of high-speed digital galvanic isolators and corresponding integrated low voltage differential signal ("LVDS") interfaces are disclosed herein. According to some embodiments, phantom power is provided to one side of a galvanic isolator from the other side of the isolator via a twisted pair cable with shielding interconnecting the two sides, and therefore eliminate the need to provide power to both sides of the galvanic isolator through different power supplies or by way of separate physical wiring being routed and connected to the two opposing sides of the isolator. Such phantom power supply configurations reduce cost, lower power consumption, and increase the number of engineering design options available in a device where high speed serial data communication with low noise are required.

30 Claims, 6 Drawing Sheets

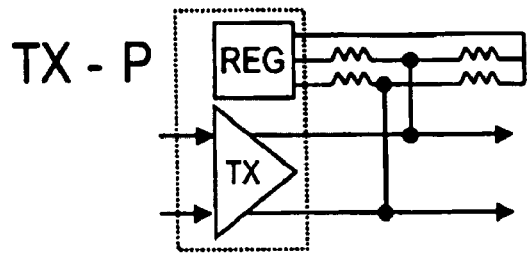 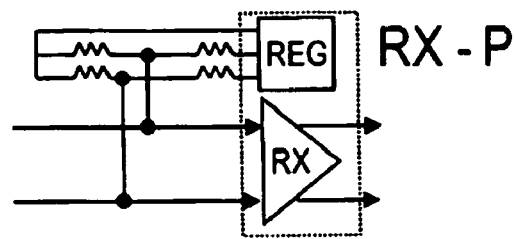
FIG. 4  FIG. 5
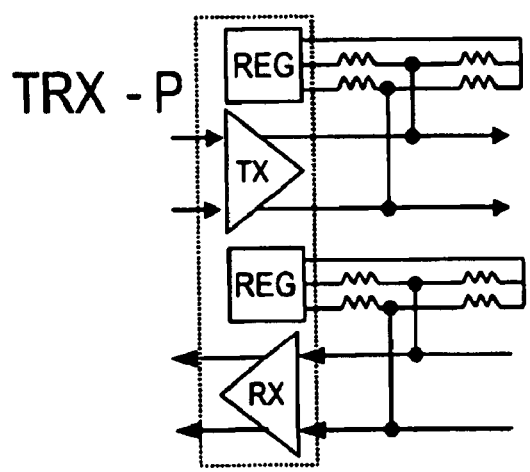 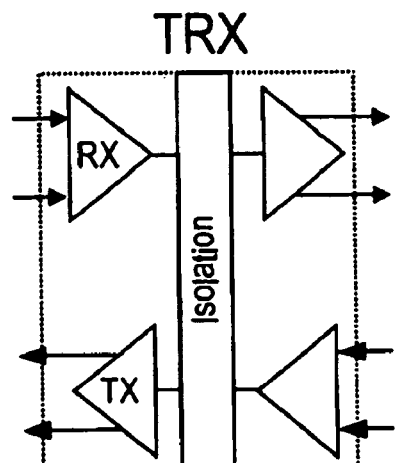
FIG. 6  FIG. 7

HIGH SPEED DIGITAL GALVANIC ISOLATOR WITH INTEGRATED LOW-VOLTAGE DIFFERENTIAL SIGNAL INTERFACE

FIELD OF THE INVENTION

Various embodiments of the invention described herein relate to the field of isolated high speed data transmission systems, devices, components and methods.

BACKGROUND

High speed digital data transmission and reception systems, devices, components and methods are known in the art. One such system is differential data transmission, in which the difference in voltage levels between two signal lines forms the transmitted signal. Differential data transmission is commonly used for data transmission rates greater than 100 Mbps over long distances.

In comparison to single-sided data transmission and reception techniques, differential signal transmission and reception techniques have several advantages, such as increased immunity and isolation from various types of noise, typically lower power consumption, and high common mode noise rejection levels. A number of problems preclude or make more difficult their more widespread use in galvanically-isolated devices and systems, however, such as the need to provide power to both sides of the galvanic isolation barrier from different power supplies or different wiring connectors or interfaces.

What is needed is a device capable of providing galvanic isolation at high data transmission and reception rates, but which does not require the provision of separate power supplies or separate external wiring for multiple power supplies.

Further details concerning various aspects of some prior art devices and methods may be found, for example, in U.S. Pat. No. 7,348,805 to Cannon et al. entitled "Chip-to-Chip Digital Transmission Circuit Delivering Power over Signal Lines" dated Mar. 25, 2008, and PCT International Publication Number WO 96126590 to Bierkeli et al. entitled "Interface Isolator Circuit for Differential Signals" dated Aug. 29, 1996.

SUMMARY

In some embodiments, there is provided a high-speed digital isolator comprising a transmitter circuit comprising a first low-voltage differential signal ("LVDS") interface configured to receive input differential data signals, a receiver circuit comprising a second LVDS interface configured to provide output differential data signals therefrom, and a shielded twisted pair cable ("TPC") comprising first and second electrical conductors and an electrically conductive shield disposed thereover, the TPC being disposed between the transmitter circuit and the receiver circuit and operably coupled thereto, the TPC further being configured to convey the input differential data signals from the transmitter circuit to the receiver circuit, and to provide phantom power to the transmitter circuit from the receiver circuit, via the first and second electrical conductors and the shield, the TPC having an impedance $Z_0$ associated therewith, wherein the transmitter circuit is configured to provide galvanic isolation between the transmitter circuit and the receiver circuit.

In other embodiments, there is provided a high-speed digital isolator comprising a transmitter circuit comprising a first low-voltage differential signal ("LVDS") interface configured to receive input differential data signals, a receiver circuit comprising a second LVDS interface configured to provide output differential data signals therefrom, and a shielded twisted pair cable ("TPC") comprising first and second electrical conductors and an electrically conductive shield disposed thereover, the TPC being disposed between the transmitter circuit and the receiver circuit and operably coupled thereto, the TPC further being configured to convey the input differential data signals from the transmitter circuit to the receiver circuit, and to provide phantom power to the receiver circuit from the transmitter circuit, via the first and second electrical conductors and the shield, the TPC having an impedance $Z_0$ associated therewith, wherein the receiver circuit is configured to provide galvanic isolation between the transmitter circuit and the receiver circuit.

In still other embodiments, there is provided a high-speed digital transmitter comprising a low-voltage differential signal ("LVDS") interface configured to receive input differential data signals therethrough, a transmitter circuit operably coupled to the LVDS interface and configured to transmit the differential data signals therefrom, and a shielded twisted pair cable ("TPC") comprising first and second electrical conductors and an electrically conductive shield disposed thereover, the TPC being operably connected to the transmitter circuit to convey the differential data signals therethrough and to provide phantom power to the transmitter circuit from an external source via the first and second electrical conductors and the shield, the TPC having an impedance $Z_0$ associated therewith, wherein the high-speed digital transmitter is configured to provide galvanic isolation between the transmitter circuit and a receiver circuit.

In further embodiments, there is provided a high-speed digital receiver comprising a low-voltage differential signal ("LVDS") interface configured to provide output differential data signals therefrom, a receiver circuit operably coupled to the LVDS interface and configured to convey the differential data signals thereto, and a shielded twisted pair cable ("TPC") comprising first and second electrical conductors and an electrically conductive shield disposed thereover, the TPC being operably connected to the receiver circuit to convey the differential data signals thereto from a transmitter circuit and to provide phantom power to the receiver circuit from an external source via the first and second electrical conductors and the shield, the TPC having an impedance $Z_0$ associated therewith, wherein the high-speed digital receiver is configured to provide galvanic isolation between the receiver circuit and the transmitter circuit.

In still further embodiments, there is provided a high-speed digital transceiver comprising a transmitter circuit comprising a first low-voltage differential signal ("LVDS") interface configured to receive first differential data signals, a receiver circuit comprising a second LVDS interface configured to receive second differential data signals, and first and second shielded twisted pair cables ("TPCs"), each TPC comprising first and second electrical conductors and an electrically conductive shield disposed thereover, the first TPC being operably coupled to outputs of the transmitter circuit, the second TPC being operably coupled to inputs of the receiver circuit, each TPC further being configured to convey differential data signals therethrough and to provide phantom power to the transmitter and receiver circuits, respectively, from external sources, wherein the transmitter and receiver circuits are configured to provide galvanic isolation in respect of circuits external to the transceiver.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIGS. 4 and 5 show the provision of phantom power according to some embodiments;

FIGS. 6 and 7 show embodiments containing both transmitter and receiver circuits.

The drawings are not necessarily to scale. Like numbers refer to like parts or steps throughout the drawings, unless otherwise noted.

DETAILED DESCRIPTION OF SOME PREFERRED EMBODIMENTS

Figure 1:
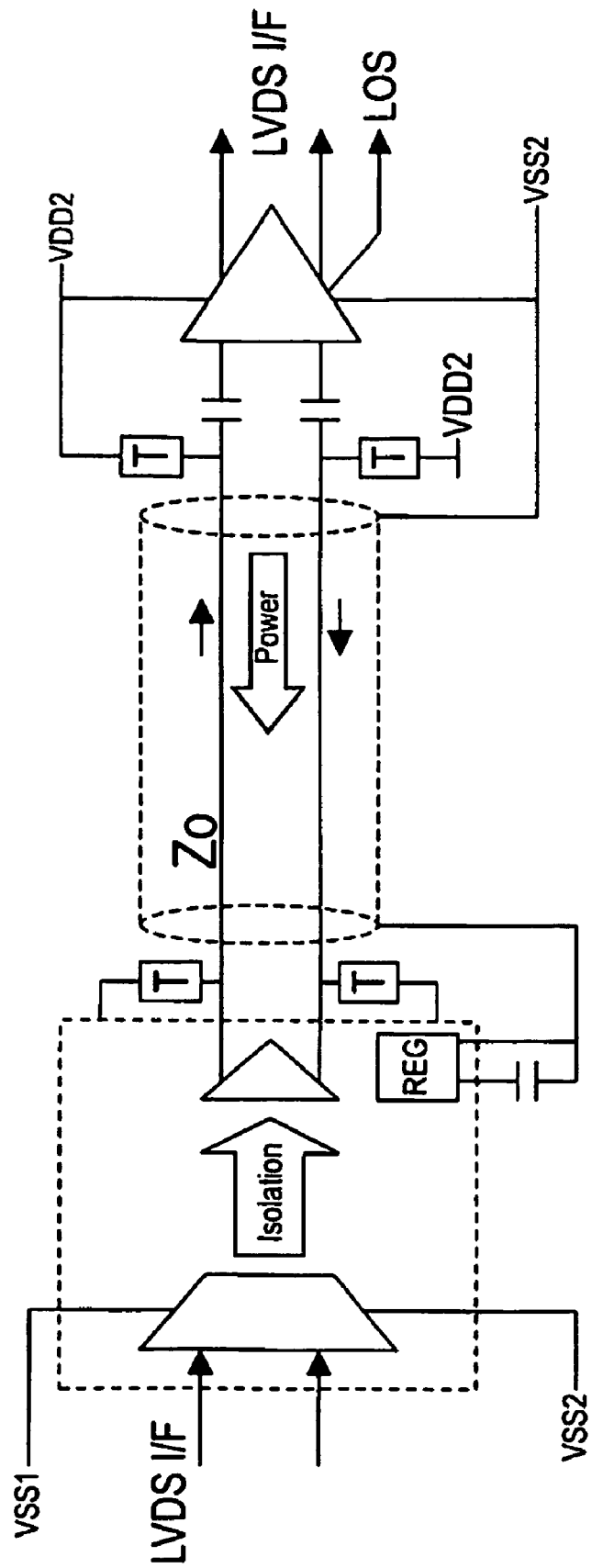
FIG. 1 shows one embodiment of a high-speed digital isolator.

FIG. 1 shows one embodiment of high-speed digital isolator 10, which comprises transmitter circuit 20 having first low-voltage differential signal ("LVDS") interface 22 configured to receive input differential data signals 24 and 26. Receiver circuit 30 comprises second LVDS interface 32 configured to provide output differential data signals 34 and 36 therefrom. Shielded twisted pair cable ("TPC") 40 comprises first and second electrical conductors 42 and 44 and electrically conductive shield 49 disposed thereover. TPC 40 is disposed between transmitter circuit 20 and receiver circuit 20, and is operably coupled thereto. In one embodiment, TPC 40 is configured to convey input differential data signals 24 and 26 from transmitter circuit 20 to receiver circuit 30, and to provide phantom power 50 to transmitter circuit 20 from receiver circuit 30 via first and second electrical conductors 42 and 44 and shield 49. In preferred embodiments, transmitter circuit 20 comprises voltage regulator 80, which is configured to regulate power 50 provided by receiver circuit 30 via TPC 40. Transmitter circuit 20 may be configured as an integrated circuit which provides galvanic isolation between the transmitter circuit and the receiver circuit.

Continuing to refer to FIG. 1, TPC 40 has an impedance $Z_0$ associated therewith. Termination resistors 62 and 64 are operably coupled to termination ends of first and second electrical conductors 42 and 44 in transmitter circuit 20, and in preferred embodiments each have an impedance of about $Z_0/2$. Similarly, source resistors 66 and 68 are operably coupled to source ends of first and second electrical conductors 42 and 44 in receiver circuit 30, where each source resistor has an impedance of about $Z_0/2$. In the embodiment shown in FIG. 1, a representative impedance for $Z_0$ is between about 100 and about 110 ohms, and thus resistors 62, 64, 66 and 68 each have values of about 50-55 ohms, and phantom power 50 has a representative DC voltage of about 3.3 to about 3.5 volts. Thus, the average DC power supply voltage provided on each of conductors 42 and 44 between shield 49 is about 1.65 to about 1.75 volts, and power is conducted therethrough in common mode. On the other hand, the magnitude of the differential ac signals provided over the same conductors, by way of example, may be only 100 mV. Provided the differential data signal is well balanced in isolator 10, little or no current is induced by such signals in shield 49. It will now be seen that termination and source resistors 62, 64, 66 and 68 are required to establish reasonably balanced differential signal transmission and reception, and that the values of such resistors should be selected to match the characteristic impedance of the transmission line (i.e., TPC 40). Note that in FIG. 1 arrows 46 and 48 illustrate current flow direction according to one embodiment of the invention.

While in FIG. 1 phantom power 50 is provided to transmitter circuit 20 by receiver circuit 30 through TPC 40, and transmitter circuit 20 is configured to provide galvanic isolation to isolator 10, other configurations may also be employed, such as phantom power 50 being provided to receiver circuit 30 by transmitter circuit through TPC 40, and/or receiver circuit 30 being configured to provide galvanic isolation 70 to isolator 10. In any event, in accordance with the various embodiments of the invention, galvanic isolation 70 in digital isolator 10 must be provided in one or both of transmitter circuit 20 and/or receiver circuit 30.

One advantage of providing phantom power 50 in accordance with the various embodiments of the invention, whatever specific configuration is employed, is that the need to provide an additional power supply or power supply connection or wire on the primary side of transmitter circuit 20 or the primary side of receiver circuit 30 is eliminated. This, in turn, reduces system cost by eliminating physical connections, wires, power supplies, materials and labor that would otherwise be required, and also increases design freedom by eliminating the requirement to feed power to opposing sides of a galvanic isolator using different sources of power or separate electrical connections. Note that in preferred embodiments, LVDS interfaces 22 and 32 are incorporated into or form portions of transmitter circuit 20 and receiver circuit 30, respectively, and that in yet further preferred embodiments LVDS interfaces 22 and 32 are incorporated into or form a portion of one or more integrated circuits into which transmitter circuit 20 and/or receiver circuit 30 are also incorporated. Note further that LVDS interfaces 22 and 32 may be connected directly to one or more printed circuit boards (PCBs) or other integrated circuits.

Other advantages arise from the use of differential signal digital isolator 10 illustrated in FIG. 1 and related embodiments, such as increasing the rate at which data may be conveyed through device 10, eliminating or reducing the magnitude of ground loops, increasing the distances over which digital signals can be transmitted and received faithfully, reducing or eliminating electrical noise such as EMI and EMS, increasing common mode rejection (CMR) of noise, and permitting the supply voltages provided to isolator 10 to be lowered thereby reducing power consumption.

Continuing to refer to FIG. 1, in some embodiments high-speed digital isolator 10 is configured to convey data signals therethrough at a rate exceeding about 100 Mbps, or between about 500 Mbps and about 3.75 Gbps. Other data rates are also contemplated.

According to the particular application at hand, TPC 40 may have a length exceeding or of about 0.5 meters, about 1 meter, about 2 meters, about 3 meters, about 4 meters, about 5 meters, about 6 meters, about 7 meters, about 8 meters, about 9 meters, about 10 meters, about 20 meters, about 30 meters or about 50 meters. Other lengths of TPC 40 are also contemplated.

In a preferred embodiment, isolator 10 is configured to adjust skew between clock and data rates using clock data recovery ("CDR") techniques.

Specifications for standardized LVDS interfaces may be found in ANSI/TIA/EIA-644 ("Electrical Characteristics of Low Voltage Differential Signaling (LVDS) Interface Circuits"). EIA/TIA-644 defines a differential interface having an electrical layer only for a receiver and a transmitter. LVDS may be used with either a cable or board interface. An LVDS interface is preferably designed with an output voltage swing of 350 mV and speeds exceeding 400 Mbps into a 100 ohm load across a distance of about 10 meters. As with all buses, the type of cable determines cable length or bus speed. For example, Category 3 (CAT3) cable may be used for cables up to 10 meters in length, while CAT5 cable may be used for longer runs (~20 meters at 100 Mbps, ~50 meters at 50 Mbps, ~100 meters at 10 Mbps). Ribbon cable may be used for sub meter runs. Generally accepted LVDS Edge rates are 1V/nS, and an acceptable output voltage is 350 mV [250 mV min., 450 mV max.]. The center voltage is 1.2 volts. LVDS interfaces typically employ a current-mode driver output from a 3.5 mA current source. This drives a differential line that is terminated by a 100 ohm resistor, generating about 350 mV across the receiver. The ±350 mV voltage swing may be centered on a 1.2V offset voltage.

Figure 2:
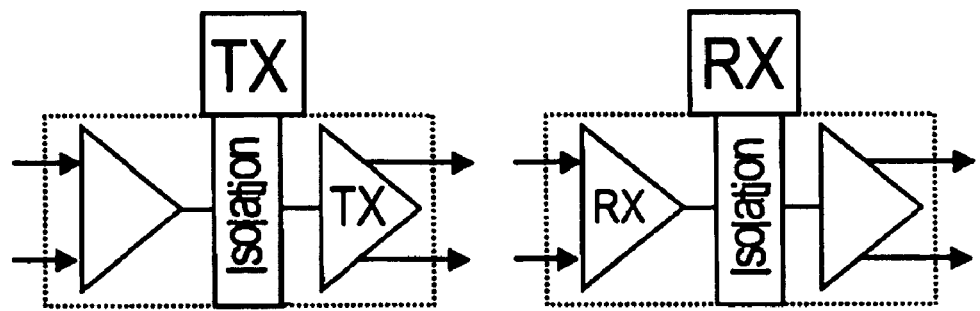
FIG. 2 shows another embodiment of a high-speed digital isolator.

Referring now to FIG. 2, there is shown another embodiment of the invention where high-speed digital transmitter circuit 20 comprises LVDS interface 22, galvanic isolator 70, and transmitter 12, and high-speed digital receiver circuit 30 comprises receiver 14, galvanic isolator 70 and LVDS interface 32.

Figure 3:
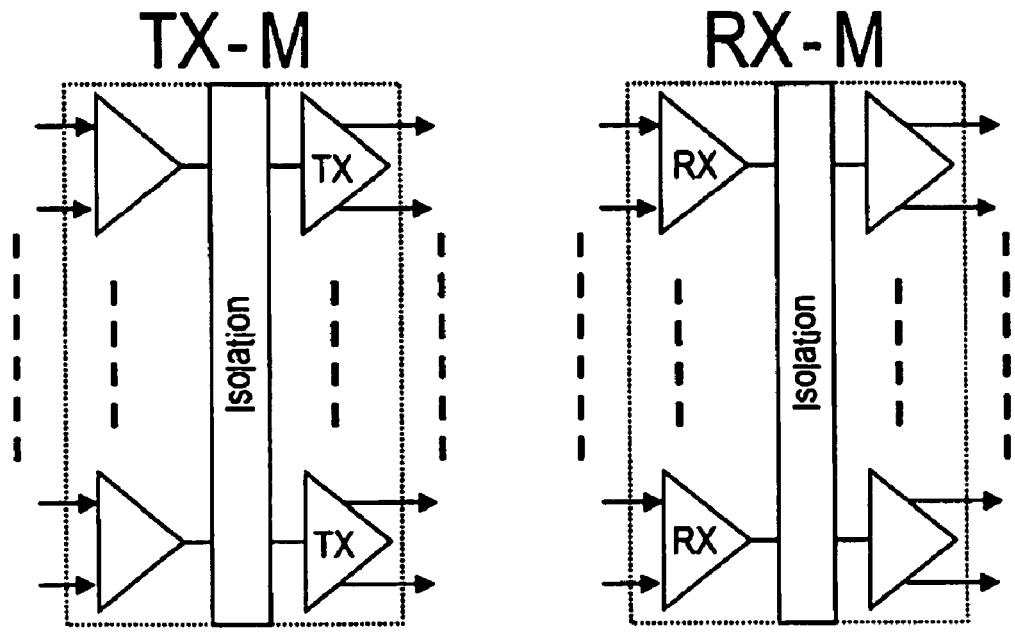
FIG. 3 shows an embodiment comprising multiple high-speed digital isolators.

FIG. 3 shows an embodiment of the invention where multiple transmitter circuits 20, each including a transmitter 12 and corresponding LVDS interfaces 22, are arranged and provided for in high-speed digital transmitter module 201, and multiple receiver circuits 30, each including a receiver 14 and corresponding LVDS interface 32, are arranged and provided for in high-speed digital receiver module 301.

FIGS. 4 and 5 show embodiments where voltage regulators 80 and phantom power supplies are connected to TPC 40 in high-speed digital transmitter circuit 20 and high-speed digital receiver circuit 30, respectively, to provide common mode power supplies thereto.

FIGS. 6 and 7 show embodiments where high-speed transceivers 16 contain both transmitter circuits 20 and receiver circuits 30, along with LVDS interfaces 22 and 32, respectively. Phantom power supplies are provided in the embodiment of transceiver 16 illustrated in FIG. 6

Figure 8:
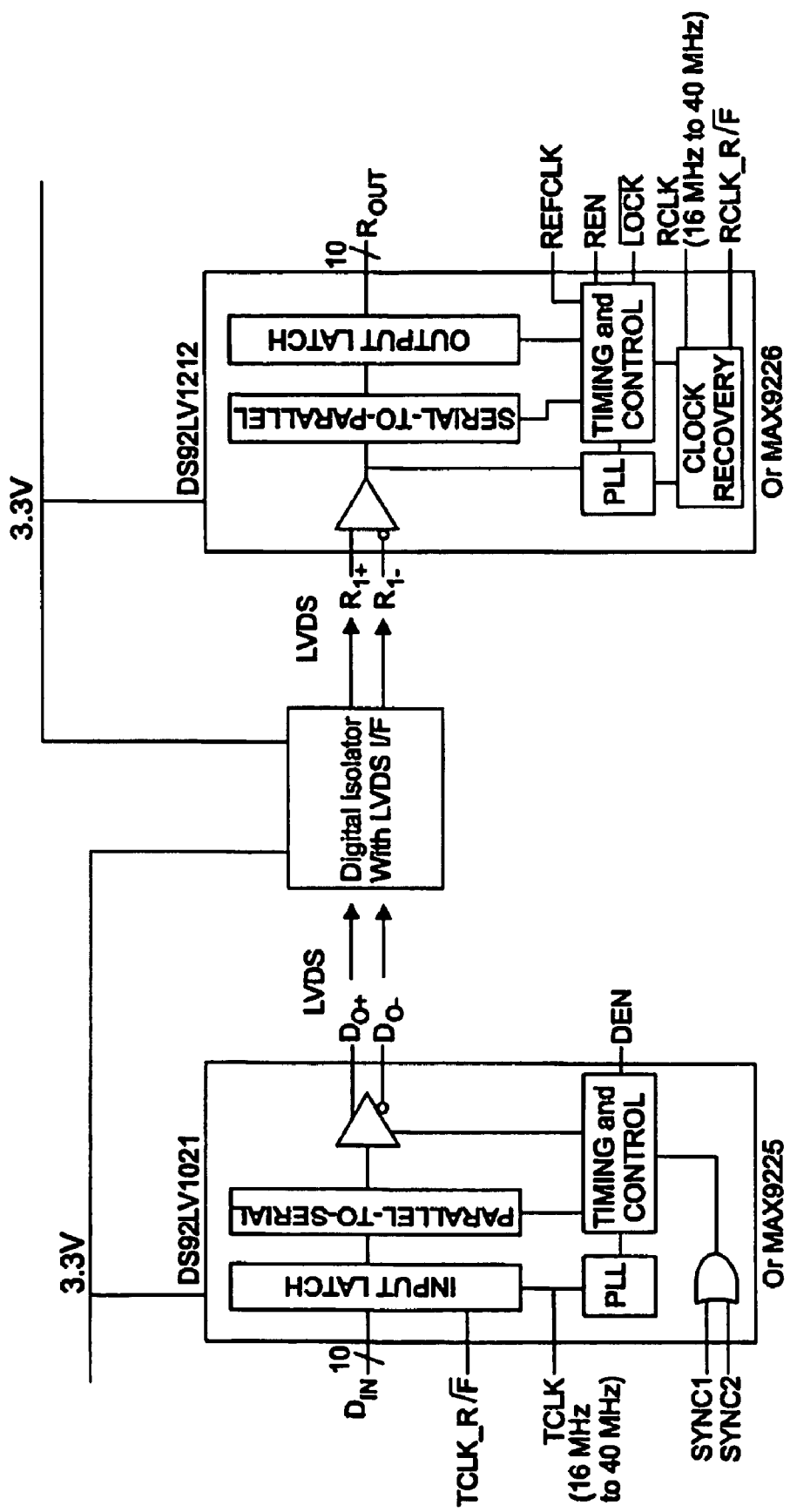
FIG. 8 shows an embodiment having a high speed isolator configured to connect a serializer and a de-serializer.

FIG. 8 shows an embodiment of the invention particularly well adapted to permit high speed serial communication of data where serializer 120 is operably connected high-speed digital isolator 10, which in turn is operably connected to de-serializer 130. As shown, LVDS interface 22 incorporated into isolator 10 operably connects serializer 120 to isolator 10, and LVDS 32 incorporated into isolator 10 operably connects de-serializer to isolator 10. This embodiment permits galvanic isolation to be provided between serializer 120 and de-serializer 130, while avoiding the problems arising from conventional single-ended configurations where voltage mismatches and imbalances are much more likely to occur and to be of greater magnitude. In addition, the embodiment shown in FIG. 8 eliminates problems arising from independent signal paths introducing eye distortion due to time delay and threshold voltage variations. The embodiment illustrated in FIG. 8 may also be implemented such that digital isolator 10 contains no TPC 40, and instead permits a digital galvanic isolator to be placed between serializer 120 and de-serializer 130 which has LVDS interfaces 22 and 32 incorporated therein.

Figure 9:
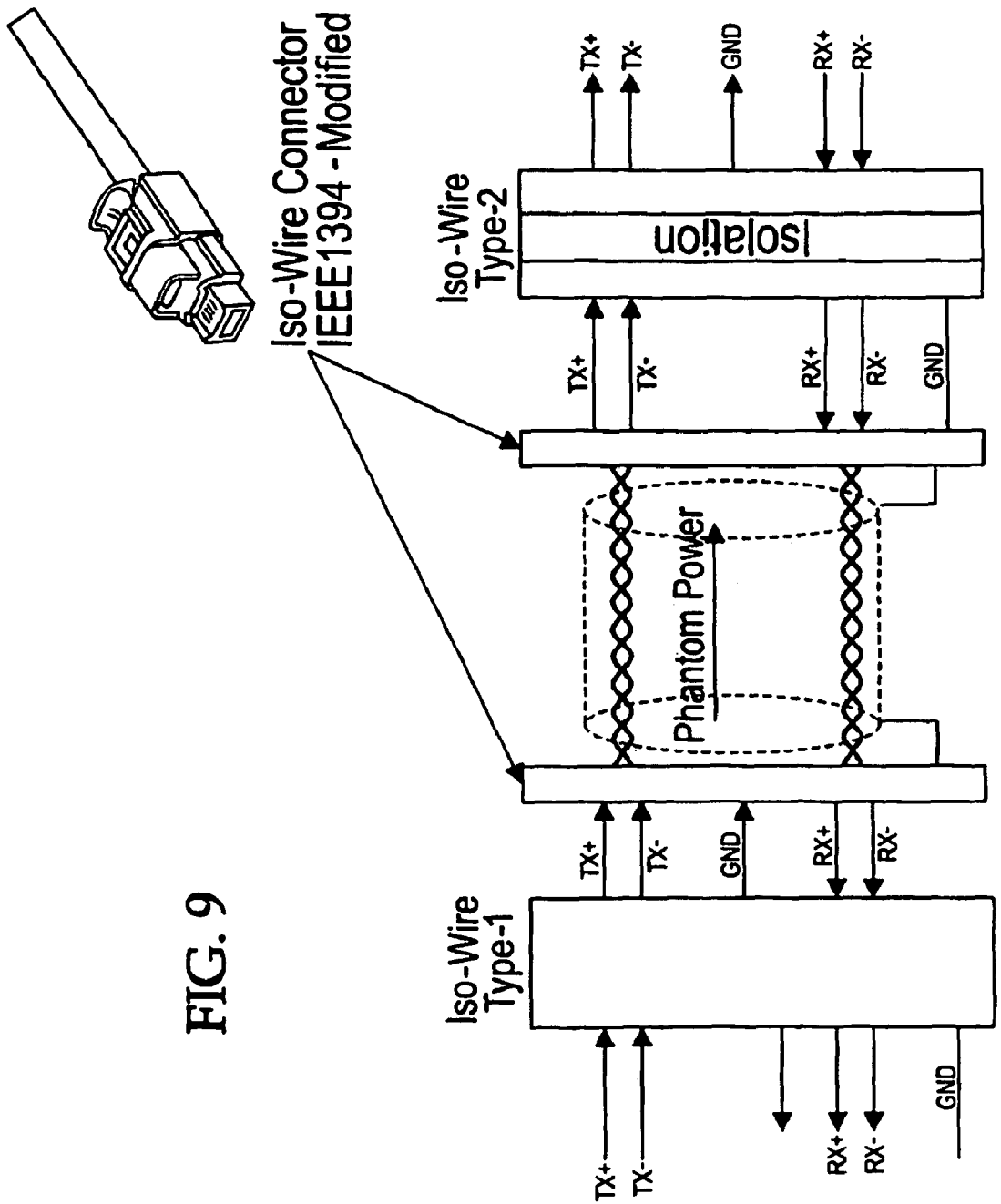
FIG. 9 shows an embodiment that permits Type 1 data interfaces to be connected to Type 2 interfaces.

FIG. 9 shows an embodiment that permits Type 1 data interfaces (which in LAN configurations typically terminate in a single data connector) to be connected to Type 2 interfaces (which in LAN configurations typically terminate in a one data connector and one telephone jack connector) by means of LVDS interfaces 41 and 43, which are interconnected with one another by TPC 40. As shown in FIG. 9, phantom power may be supplied in either direction through TPC 40. Transmitted signals 46/48 are conveyed in a first direction through LVDS interface 41, TPC 40 and LVDS Interface 43. Received signals 34/36 are conveyed in an opposite second direction through LVDS interface 43, TPC 40 and LVDS interface 41. Phantom power is supplied along the same conductors as transmitted signals 46/48 or received signals 34/36, as the case may be. A pathway to electrical ground Is provided by ground 53. Note that modified IEEE 1384 connectors may be employed to plug into LVDS interfaces 41 and 43.

Figure 10:
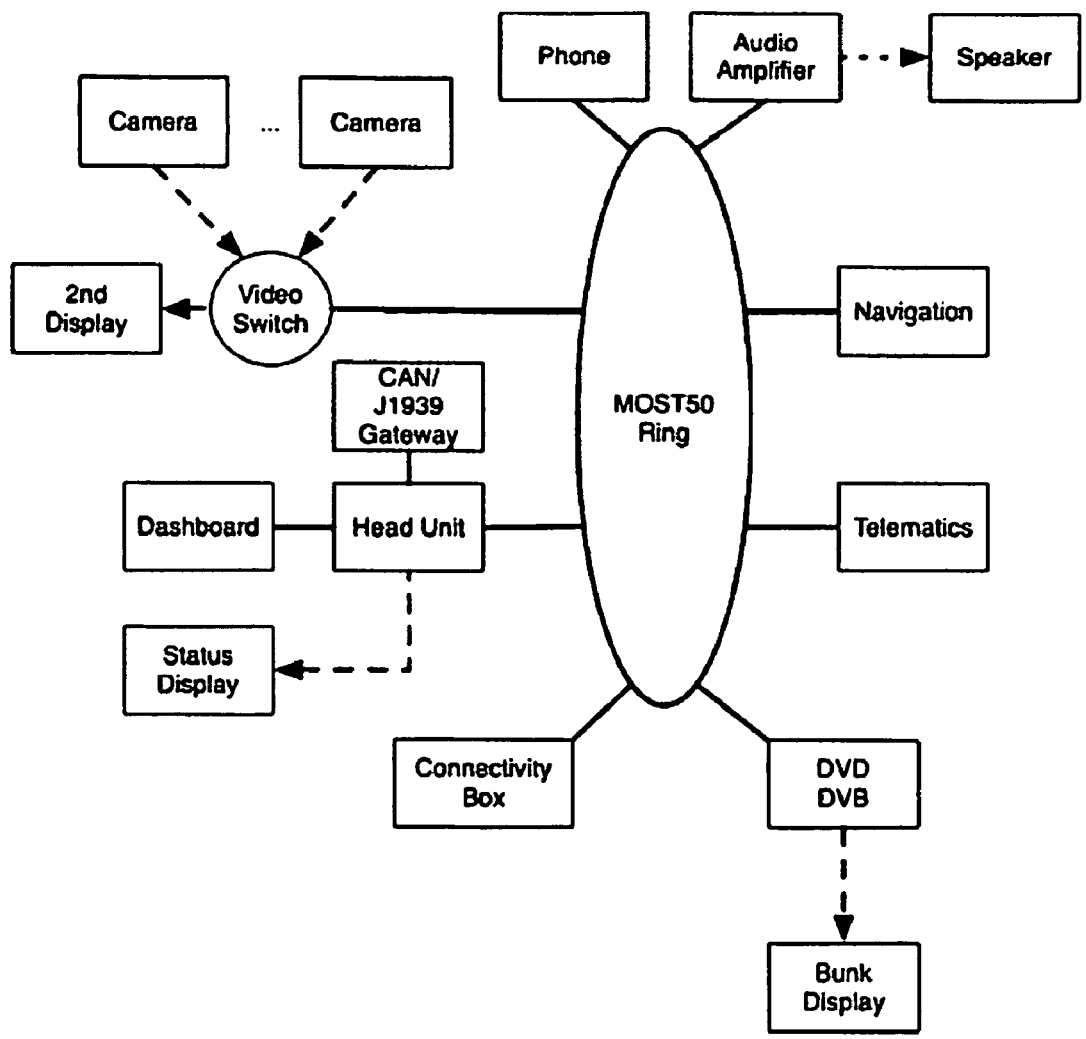
FIG. 10 shows an embodiment of a MOST ("Media Oriented System Transport") system.

FIG. 10 shows one embodiment of a MOST ("Media Oriented System Transport") system 100 finding particularly efficacious application in automobiles. System 100 is configured and adapted to provide a suitable solution for transferring multi-media data inside an automobile, and to that end various MOST standards have been defined or are in the process of being defined, such as MOST25, MOST50, and MOST150. In the system 100 shown in FIG. 10, for example, MOST50 ring acts as a data bus which organizes and conveys digital signals to various portions of system 100, such as the Head Unit, the Connectivity Box, Telematics, Navigation, Phone, Camera, etc. Use of the LVDS interfaces, the TPC, and the differential data transmission and/or reception configurations, devices and methods of the invention permits system 100 to operate at high speeds (e.g., between about 25 Mbps and about 1 Gbps) over long link lengths (e.g., up to or exceeding about exceeding about 0.5 meters, about 1 meter, about 2 meters, about 3 meters, about 4 meters, about 5 meters, about 6 meters, about 7 meters, about 8 meters, about 9 meters, about 10 meters, about 20 meters, about 30 meters or about 50 meters) than has heretofore been possible. In addition, adaptation of a MOST system for use with the LVDS interfaces, the TPC, and the differential data transmission and/or reception configurations, devices and methods of the invention permits high degrees of electrical isolation to and noise immunity to be achieved. As in some of the preceding embodiments; phantom power may be supplied to various components of system 100 in accordance with the teachings of the invention, while some physical wiring and electrical interconnections may also be eliminated. As in other embodiments of the invention, engineering design freedom is enhanced through the elimination of wiring and by increasing power supply options.

The various embodiments of the invention may be adapted for use in automobiles, fiber optic channels, industrial controls, SerDes (serializer/deserializer) applications, high speed serial data transmission applications in flat panel displays (FPDs), inside high definition televisions (HDTVs), Layer 2 switches, the backbones of various types of measurement devices, MOST applications and yet further applications those skilled in the art will recognize after having read and understood the present specification and drawings.

The above-described embodiments should be considered as examples of the present invention, rather than as limiting the scope of the invention. In addition to the foregoing embodiments of the invention, review of the detailed description and accompanying drawings will show that there are other embodiments of the invention. Accordingly, many combinations, permutations, variations and modifications of the foregoing embodiments of the invention not set forth explicitly herein will nevertheless fall within the scope of the invention.

I claim:

1. A high-speed digital isolator, comprising:
a transmitter circuit comprising a first low-voltage differential signal ("LVDS") interface configured to receive input differential data signals;
a receiver circuit comprising a second LVDS interface configured to provide output differential data signals therefrom;
a shielded twisted pair cable ("TPC") comprising first and second electrical conductors and an electrically conductive shield disposed thereover, the TPC being disposed between the transmitter circuit and the receiver circuit and operably coupled thereto, the TPC further being configured to convey the input differential data signals from the transmitter circuit to the receiver circuit, and to provide phantom power to the transmitter circuit from the receiver circuit, via the first and second electrical conductors and the shield, the TPC having an impedance $Z_0$ associated therewith;
first and second termination resistors operably coupled to termination ends of the first and second electrical conductors in the transmitter circuit, respectively, each termination resistor having an impedance of about $Z_0/2$; and
first and second source resistors operably coupled to source ends of the first and second electrical conductors in the receiver circuit, respectively, each source resistor having an impedance of about $Z_0/2$;
wherein the transmitter circuit is configured to provide galvanic isolation between the transmitter circuit and the receiver circuit; and
wherein the transmitter circuit further comprises a voltage regulator configured to regulate power received from the receiver circuit via the TPC.

2. The high-speed digital isolator of claim 1, wherein the isolator is configured to convey data signals therethrough at a rate exceeding about 100 Mbps.

3. The high-speed digital isolator of claim 1, wherein the isolator is configured to convey data signals therethrough at a rate between about 500 Mbps and about 3.75 Gbps.

4. The high-speed digital isolator of claim 1, wherein the TPC has a length exceeding about 0.5 meters, about 1 meter, about 2 meters, about 3 meters, about 4 meters, about 5 meters, about 6 meters, about 7 meters, about 8 meters, about 9 meters, about 10 meters, about 20 meters, about 30 meters or about 50 meter.

5. The high-speed digital isolator of claim 1, wherein the isolator is further configured to adjust skew between clock and data rates using clock data recovery ("CDR") techniques.

6. The high-speed digital isolator of claim 1, wherein the isolator is incorporated into a Media Oriented System Transport ("MOST") network.

7. The high-speed digital isolator of claim 6, wherein the MOST network is incorporated into an automobile.

8. The high-speed digital isolator of claim 6, wherein the MOST network is configured to operate a speed ranging between about 25 Mbps and about 1 Gbps.

9. The high-speed digital isolator of claim 1, wherein the transmitter circuit is a serializer and the receiver circuit is a deserializer.

10. The high-speed digital isolator of claim 1, wherein the receiver circuit is an integrated circuit.

11. The high-speed digital isolator of claim 1, wherein the transmitter circuit is an integrated circuit.

12. A high-speed digital isolator, comprising:
a transmitter circuit comprising a first low-voltage differential signal ("LVDS") interface configured to receive input differential data signals;
a receiver circuit comprising a second LVDS interface configured to provide output differential data signals therefrom;
a shielded twisted pair cable ("TPC") comprising first and second electrical conductors and an electrically conductive shield disposed thereover, the TPC being disposed between the transmitter circuit and the receiver circuit and operably coupled thereto, the TPC further being configured to convey the input differential data signals from the transmitter circuit to the receiver circuit, and to provide phantom power to the receiver circuit from the transmitter circuit, via the first and second electrical conductors and the shield, the TPC having an impedance $Z_0$ associated therewith;
first and second termination resistors operably coupled to termination ends of the first and second electrical conductors in the transmitter circuit, respectively, each termination resistor having an impedance of about $Z_0/2$; and
first and second source resistors operably coupled to source ends of the first and second electrical conductors in the receiver circuit, respectively, each source resistor having an impedance of about $Z_0/2$;
wherein the receiver circuit is configured to provide galvanic isolation between the transmitter circuit and the receiver circuit; and
wherein the receiver circuit further comprises a voltage regulator configured to regulate power received from the transmitter circuit via the TPC.

13. The high-speed digital isolator of claim 12, wherein the isolator is configured to convey data signals therethrough at a rate exceeding about 100 Mbps.

14. The high-speed digital isolator of claim 12, wherein the isolator is configured to convey data signals therethrough at a rate between about 500 Mbps and about 3.75 Gbps.

15. The high-speed digital isolator of claim 12, wherein the TPC has a length exceeding about 0.5 meters, about 1 meter, about 2 meters, about 3 meters, about 4 meters, about 5 meters, about 6 meters, about 7 meters, about 8 meters, about 9 meters, about 10 meters, about 20 meters, about 30 meters or about 50 meters.

16. The high-speed digital isolator of claim 12, wherein the isolator is further configured to adjust skew between clock and data rates using clock data recovery ("CDR") techniques.

17. The high-speed digital isolator of claim 12, wherein the transmitter circuit is a serializer and the receiver circuit is a deserializer.

18. The high-speed digital isolator of claim 12, wherein the isolator is incorporated into a Media Oriented System Transport ("MOST") network.

19. The high-speed digital isolator of claim 18, wherein the MOST network is incorporated into an automobile.

20. The high-speed digital isolator of claim 18, wherein the MOST network is configured to operate a speed ranging between about 25 Mbps and about 1 Gbps.

21. The high-speed digital isolator of claim 12, wherein the transmitter circuit is an integrated circuit.

22. The high-speed digital isolator of claim 12, wherein the receiver circuit is an integrated circuit.

23. A high-speed digital transmitter, comprising:
a low-voltage differential signal ("LVDS") interface configured to receive input differential data signals therethrough;

a transmitter circuit operably coupled to the LVDS interface and configured to transmit the differential data signals therefrom;

a shielded twisted pair cable ("TPC") comprising first and second electrical conductors and an electrically conductive shield disposed thereover, the TPC being operably connected to the transmitter circuit to convey the differential data signals therethrough and to provide phantom power to the transmitter circuit from an external source via the first and second electrical conductors and the shield, the TPC having an impedance $Z_0$ associated therewith; and first and second termination resistors operably coupled to termination ends of the first and second electrical conductors in the transmitter circuit, respectively, each termination resistor having an impedance of about $Z_0/2$;

wherein the high-speed digital transmitter is configured to provide galvanic isolation between the transmitter circuit and a receiver circuit; and wherein the transmitter circuit comprises a voltage regulator configured to regulate power received via the TPC.

24. The high-speed digital transmitter of claim 23, wherein the transmitter circuit is incorporated into an integrated circuit.

25. The high-speed digital transmitter of claim 23, wherein the external source is the receiver circuit.

26. A high-speed digital receiver, comprising:

a low-voltage differential signal ("LVDS") interface configured to provide output differential data signals therefrom;

a receiver circuit operably coupled to the LVDS interface and configured to convey the differential data signals thereto;

a shielded twisted pair cable ("TPC") comprising first and second electrical conductors and an electrically conductive shield disposed thereover, the TPC being operably connected to the receiver circuit to convey the differential data signals thereto from a transmitter circuit and to provide phantom power to the receiver circuit from an external source via the first and second electrical conductors and the shield, the TPC having an impedance $Z_0$ associated therewith; and first and second source resistors operably coupled to source ends of the first and second electrical conductors in the receiver circuit, respectively, each source resistor having an impedance of about $Z_0/2$;

wherein the high-speed digital receiver is configured to provide galvanic isolation between the receiver circuit and the transmitter circuit; and wherein the receiver circuit comprises a voltage regulator configured to regulate power received from the transmitter circuit via the TPC.

27. The high-speed digital receiver of claim 26, wherein the receiver circuit is incorporated into an integrated circuit.

28. The high-speed digital transmitter of claim 26, wherein the external source is the transmitter circuit.

29. A high-speed digital transceiver, comprising:

a transmitter circuit comprising a first low-voltage differential signal ("LVDS") interface configured to receive first differential data signals;

a receiver circuit comprising a second LVDS interface configured to receive second differential data signals;

first and second shielded twisted pair cables ("TPCs"), each TPC comprising first and second electrical conductors and an electrically conductive shield disposed thereover, the first TPC being operably coupled to outputs of the transmitter circuit, the second TPC being operably coupled to inputs of the receiver circuit, each TPC further being configured to convey differential data signals therethrough and to provide phantom power to the transmitter and receiver circuits, respectively, from external sources; and at least one voltage regulator configured to regulate power received via the first or second TPC;

wherein the transmitter and receiver circuits are configured to provide galvanic isolation in respect of circuits external to the transceiver.

30. The high-speed digital transceiver of claim 29, wherein the receiver and transmitter circuits are incorporated into at least one integrated circuit.

* * * * *